Figure 1:
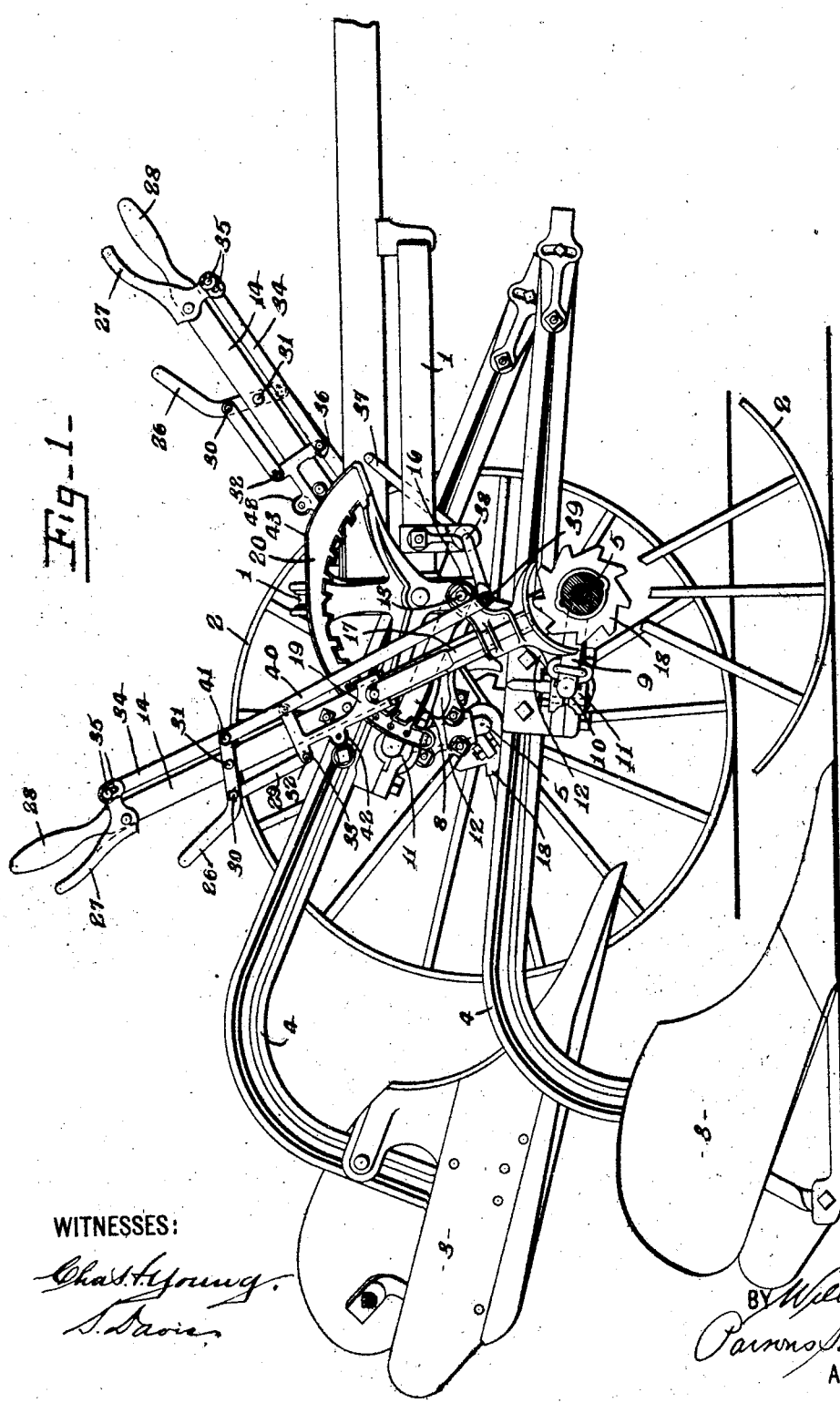

W. H. LEE.
SULKY PLOW.
APPLICATION FILED AUG. 7, 1912.

1,109,535.

Patented Sept. 1, 1914.
3 SHEETS—SHEET 1.

WITNESSES:
Chas. H. Young.
S. Davis.

INVENTOR
William H. Lee
BY Parsons Hall Bodew
ATTORNEYS

W. H. LEE.
SULKY PLOW.
APPLICATION FILED AUG. 7, 1912.
1,109,535.
Patented Sept. 1, 1914.
3 SHEETS—SHEET 2.
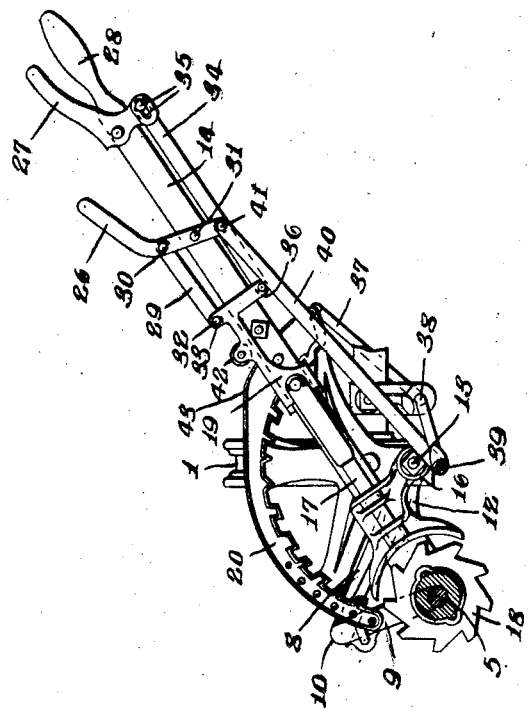
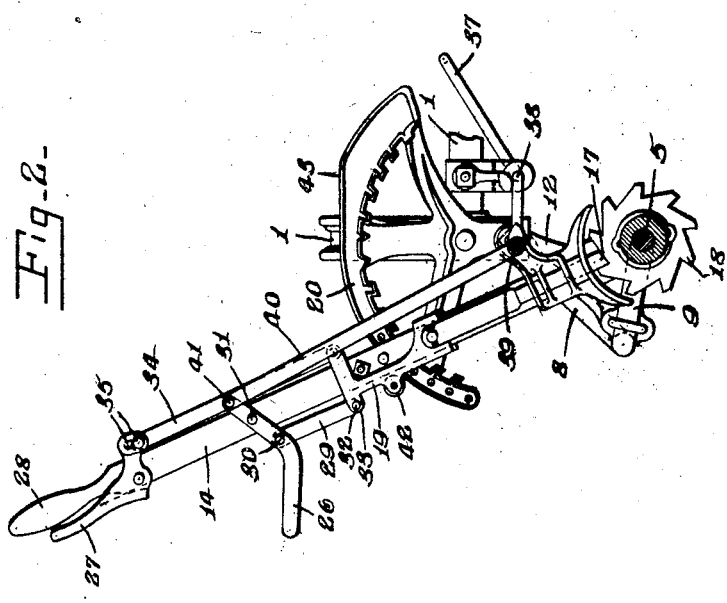
WITNESSES:
INVENTOR
ATTORNEYS

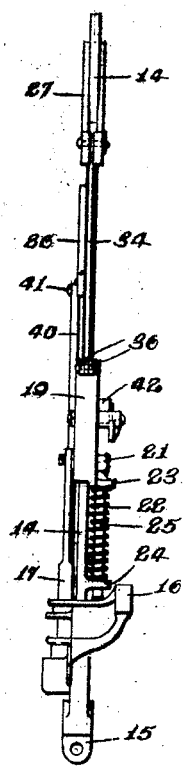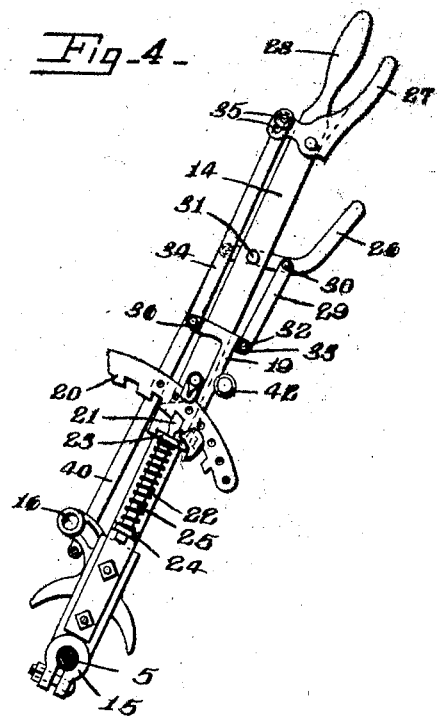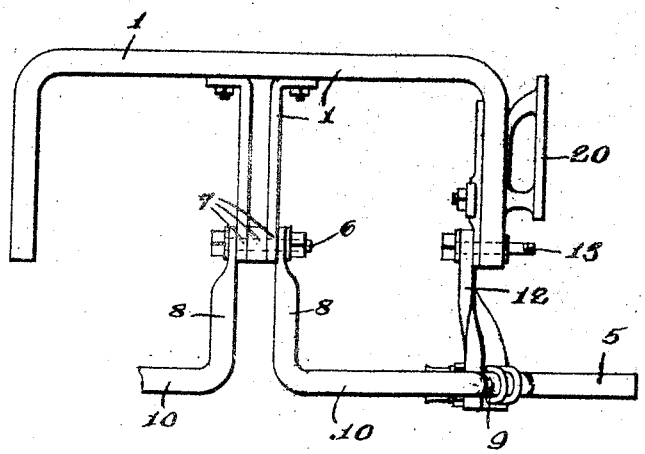

UNITED STATES PATENT OFFICE.

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

SULKY-PLOW.

1,109,535. Specification of Letters Patent. Patented Sept. 1, 1914.

Application filed August 7, 1912. Serial No. 713,781.

*To all whom it may concern:*

Be it known that I, WILLIAM H. LEE, of Syracuse, in the county of Onondaga and State of New York, have invented a certain new and useful Sulky-Plow, of which the following is a specification.

This invention relates to sulky plows, and has for its object a particularly simple and efficient mechanism for controlling the raising of the earth turning elements thereof; and the invention consists in the combinations and constructions hereinafter set forth and claimed.

In describing this invention reference is had to the accompanying drawings in which like characters designate corresponding parts in all the views.

Figure 1 is a side elevation, partly broken away, of a plow embodying this mechanism. Figs. 2 and 3 are elevations of said mechanism and contiguous parts, the clutch member being shown in Fig. 2 as having been shifted into operative position preliminary to the raising of the earth turning element, and the parts of the mechanism being shown in Fig. 3 in their positions occupied after the earth turning element has been raised. Fig. 4 is a detail view of a portion of said mechanism and contiguous parts, said mechanism being shown in opposite side elevation to that in which it is shown in Fig. 2. Fig. 5 is an edge view of parts seen in Fig. 4, parts being omitted. Fig. 6 is a detail view, partly broken away, of a portion of the frame and the crank axle carried thereby.

My invention is here illustrated as embodied in a reversible hillside sulky plow having two earth turning elements or plow bodies arranged to turn respectively right and left furrows, said elements being shiftable into and out of the ground independently of each other. However my invention may be embodied in any other type of sulky plows.

1 is the frame of the plow, and 2 are ground or supporting wheels arranged on opposite sides of the frame.

3 are the earth turning elements having beams 4 which are connected to the frame or to the crank axles to be presently described, there being one crank axle for each beam. As seen in Fig. 6, each crank axle is formed at one end with a spindle 5 upon which one of the ground wheels is mounted, and is journaled at its opposite or inner end on a spindle 6 carried by a bearing 7 associated with the frame 1, each axle being also formed with crank portions 8, 9 extending laterally from the spindles 6, 5 and connected by a cross arm 10 which is journaled in a suitable bearing 11, Fig. 1, fixed to the beam 4 of one of the earth turning elements. Each axle is also formed with a portion 12 extending parallel to the crank portion 8 and clamped or otherwise secured to the crank portion 9 of said axle. The crank portion 12 is journaled at its free end on a spindle 13 carried by the frame 1 in alinement with the spindle 6, the crank portions 8 and 12 forming a bail which carries the beam 4 of one of the earth turning elements, and the spindle 5 and the crank portion 9 forming means by which motion is transmitted to the bail. The axle construction forms no part of this invention and any other suitable axle may be substituted therefor.

The means for raising the earth turning elements out of the ground and controlling the shifting thereof into the ground, are alike in construction, and description of one of such means is deemed sufficient. Said means comprises, generally, a clutch member carried by a power-transmitting part, as a lever, fixed to the spindle 5 and pivoted to the frame 1, said clutch member being movable into and out of connection with the corresponding ground wheel and being normally out of connection therewith, an element slidable lengthwise of said lever for moving the clutch member into engagement with the corresponding ground wheel, a lever carried by the first-mentioned lever and connected to said element, and a foot lever pivoted to the frame and also connected to said element.

14 is the power-transmitting part or lever fixed at its lower end on the corresponding spindle 5 and preferably having a split bearing 15 at its lower end for engaging said spindle, Fig. 4, the lever 14 also having a bearing 16 above its lower end, which bearing is mounted on the spindle 13.

17 is a clutch member as a bolt slidable lengthwise of the lever 14 into and out of engagement with a ratchet wheel 18 associated with the adjacent ground wheel 2, the bolt 17 being guided in suitable openings in the lower end portion of the lever 14.

19 is an element slidable lengthwise of the lever 14 and connected to the clutch or bolt 17, the element 19 embracing the lever 14 and engaging opposite sides thereof, and being here shown as in the form of an open sleeve.

20 is a toothed sector supported by the frame 1 and with which coacts a locking pawl 21 carried by and suitably fixed to the sleeve 19.

22 is a spring normally pressing upwardly on the sleeve 19 to hold the pawl 21 in engagement with the toothed sector 20, the spring 22 being located between ears 23 and 24 provided on the sleeve 19 and the lever 14 respectively, the spring encircling a suitable guide rod 25 extending through an opening in the ear 24. The pawl tooth 21 usually projects above the ear 23.

The clutch member or bolt 17 is pivoted directly to the lower end of the sleeve 19, so that there will be no binding of the sliding parts 17, 19 on the lever 14, and said member 17 is located on the outer side of the lever 14, and the pawl 21, spring 22 and associated parts are located on the inner side of such lever 14.

26 and 27 are hand operated levers pivoted to the lever 14 and connected to the sleeve 19, the lever 27 being located in position to be gripped with the handle 28 at the upper end of the lever 14, and the lever 26 being located between the lever 27 and the sleeve 19. The lever 26 is connected by a link 29 to the sleeve 19 which link 29 is pivoted at 30 to the lever 26 on one side of the pivot 31 thereof, and at 32 to an ear 33 preferably located at the upper end of the sleeve 19; and the lever 27 is connected to the sleeve 19 by a link 34 pivoted to the lever 27 by a pin-and-slot 35 and to an ear 36 preferably located at the upper end of the sleeve 19, the links 29, 34 being located respectively on the rear and front sides of the lever 14.

37 is a foot lever pivoted between its ends at 38 to the frame, said foot lever having a pedal at its front end and being connected at its rear end at 39 to a link 40 which is pivoted at 41 to the lever 26 on the opposite side of the pivot 31 of such lever to that on which the link 29 is connected. Thus the motion of the foot lever 37 is transmitted to the sliding element or sleeve 19 through the lever 26. In order that the foot lever 37 will have little or no movement during the movement of the lever 14, the pivot 39 of the foot lever 37 is located near the pivot point or bearing 13 on which the lever 14 is mounted.

42 is a projecting roller carried by the sleeve and coacting with a cam face 43 on the upper side of the sector 20 for actuating the element or sleeve 19 to withdraw the bolt and move the pawl 21 into engagement with the rack or sector after the plow has been raised.

In operation, each plow may be raised either by depressing the foot lever 37 or pulling the lever 26, such movement of any one of said levers withdrawing the pawl 21 while shifting the bolt or clutch member 17 into engagement with the ratchet wheel 18. When the clutch member 17 is engaged with the ratchet wheel 18, the turning of the ground wheel 2 raises the plow owing to the construction of the crank axle, as will be understood by those skilled in the art, and when the plow is raised, the roller 42 on the member 19, engages the high point of the cam surface 43 and returns the bolt 17 and pawl 21 to their normal positions, the friction of the ratchet wheel 18 and the bolt 17 holding the bolt from being returned by the spring 22. To lower the plow, the lever 27 is operated and owing to the pin-and-slot 35, it can only be operated sufficiently to withdraw the latch or pawl 21 out of engagement with the sector 20, and does not have sufficient movement to engage the clutch member 17 with the ratchet wheel 18. This means for controlling the raising and lowering of the plow is particularly advantageous owing to the simplicity and economy of its construction and the durability of the parts thereof.

What I claim is:

1. In a sulky plow, a frame, ground wheels supporting the frame, an earth turning element connected to the frame, and means for raising the earth turning element comprising a lever pivoted to the frame and fixed to the axle of one of the ground wheels, a clutch member carried by the lever and shiftable into and out of connection with one of the ground wheels, and being normally out of connection therewith, and means for moving the clutch member into and out of connection with one of the ground wheels including an element slidable lengthwise of the lever and connected to the clutch member, an operating lever pivoted between its ends to the first mentioned lever and being connected on one side of its pivot to the slidable element, and a foot lever pivoted to the frame and connected to the operating lever on the opposite side of its pivot, substantially as and for the purpose set forth.

2. In a sulky plow, a frame, ground wheels supporting the frame, an earth turning element connected to the frame, and means for raising the earth turning element comprising a lever pivoted to the frame and fixed to the axle of one of the ground wheels, a clutch member carried by the lever and shiftable into and out of connection with one of the ground wheels, and being normally out of connection therewith, and means for moving the clutch member into and out of connection with one of the ground wheels including an element slidable lengthwise of the lever and connected to the clutch member, and operating levers pivoted to the first-mentioned lever and connected to the slidable element on opposite sides of the first-mentioned lever, substantially as and for the purpose specified.

3. In a sulky plow, a frame, ground wheels supporting the frame, an earth turning element connected to the frame, and means for raising the earth turning element comprising a lever pivoted to the frame and fixed to the axle of one of the ground wheels, a clutch member carried by the lever and shiftable into and out of connection with one of the ground wheels, and being normally out of connection therewith, and means for moving the clutch member into and out of connection with one of the ground wheels including an element slidable lengthwise of the lever and connected to the clutch member, operating levers pivoted at different points to the first-mentioned lever, and links connecting said operating levers and the slidable element, the links being arranged on opposite sides of the first-mentioned lever, substantially as and for the purpose specified.

4. In a sulky plow, a frame, ground wheels supporting the frame, an earth turning element connected to the frame, and means for raising the earth turning element comprising a lever pivoted to the frame and fixed to the axle of one of the ground wheels, a clutch member carried by the lever and shiftable into and out of connection with one of the ground wheels, and being normally out of connection therewith, and means for moving the clutch member into and out of connection with one of the ground wheels including an element slidable lengthwise of the lever and connected to the clutch member, an operating lever pivoted to the first-mentioned lever and connected to the slidable element on one side of the first-mentioned lever, a foot lever pivoted to the frame, and a link connecting the foot lever and the operating lever, and being connected thereto on the opposite side of the first-mentioned lever, substantially as and for the purpose set forth.

5. In a sulky plow, a frame, ground wheels supporting the frame, an earth turning element connected to the frame, and means for raising the earth turning element comprising a lever pivoted to the frame and fixed to the axle of one of the ground wheels, a clutch member slidable lengthwise of the lever into and out of connection with one of the ground wheels and being normally out of connection therewith, and means for operating the clutch member comprising an element slidable lengthwise of said lever and being connected at one end to the clutch member, and a foot lever pivoted between its ends to the frame and connected at its rear end to the slidable element, substantially as and for the purpose described.

6. In a sulky plow, a frame, ground wheels supporting the frame, an earth turning element connected to the frame, and means for raising the earth turning element comprising a lever pivoted to the frame and fixed to the axle of one of the ground wheels, a clutch member carried by the lever and shiftable into and out of connection with one of the ground wheels, and being normally out of connection therewith, and means for moving the clutch member into and out of connection with one of the ground wheels including a hand lever pivoted between its ends to the first-mentioned lever, connections between the rear end of the hand lever and the clutch member, and a foot lever pivoted between its ends to the frame and being connected at its rear end to said hand lever, substantially as and for the purpose specified.

7. In a sulky plow, a frame, ground wheels supporting the frame, an earth turning element connected to the frame, and means for raising the earth turning element comprising a lever pivoted to the frame and fixed to the axle of one of the ground wheels, a clutch member carried by the lever and shiftable into and out of connection with one of the ground wheels, and being normally out of connection therewith, and means for moving the clutch member into and out of connection with one of the ground wheels including a hand lever pivoted to the first-mentioned lever and connected to the clutch member, a foot lever pivoted between its ends to the frame beneath the hand lever, and an upwardly extending link pivoted to the hand lever and to the foot lever, substantially as and for the purpose set forth.

8. In a sulky plow, a frame, ground wheels supporting the frame, an earth turning element connected to the frame, and means for raising the earth turning element comprising a lever pivoted to the frame and fixed to the axle of one of the ground wheels, a clutch member carried by the lever and shiftable into and out of connection with one of the ground wheels, and being normally out of connection therewith, and means for moving the clutch member into and out of connection with one of the ground wheels including a foot lever pivoted between its ends to the frame, and connections between the rear end of the foot lever and said member, the connections including a link pivoted to the rear end of the foot lever, the pivot connecting the foot lever and the link being located near the pivot connecting the frame and the first-mentioned lever, substantially as and for the purpose described.

9. In a sulky plow, a frame, ground wheels supporting the frame, an earth turning element connected to the frame, and means for raising the earth turning element comprising a lever pivoted to the frame and fixed to the axle of one of the ground wheels, a clutch member slidable lengthwise of the lever into and out of connection with one of the ground wheels, and being normally out of connection therewith, and means for operating the clutch member including a sleeve slidable lengthwise of said lever, and connected to the clutch member, a toothed sector carried by the frame, a pawl tooth fixed to said sleeve in position to coact with the sector, a spring carried by the lever and acting on said sleeve to hold the pawl tooth in engagement with the sector and the clutch member in its normal position, the clutch member being located on one side of said lever, and the pawl tooth and spring being located on the opposite side of said lever, and means connected to the sleeve for operating the same, said means including a plurality of operating levers, links connecting said operating levers and the sleeve respectively, the links being arranged on the front and rear sides of the first-mentioned lever, substantially as and for the purpose specified.

10. In a sulky plow, a frame, ground wheels supporting the frame, an earth turning element connected to the frame, and means for raising the earth turning element comprising a lever pivoted to the frame and fixed to the axle of one of the ground wheels, a clutch member slidable lengthwise of the lever into and out of connection with one of the ground wheels and being normally out of connection therewith, and means for operating the clutch member including a sleeve slidable lengthwise of said lever, and connected to the clutch member, a toothed sector carried by the frame, a pawl tooth fixed to said sleeve in position to coact with the sector, a spring carried by the lever and acting on said sleeve to hold the pawl tooth in engagement with the sector and the clutch member in its normal position, the clutch member being located on one side of said lever, and the pawl tooth and spring being located on the opposite side of said lever, and means connected to the sleeve for operating the same, said means including a plurality of operating levers, links connecting said operating levers and the sleeve respectively, the links being arranged on the front and rear sides of the first-mentioned lever, a foot lever pivoted between its ends to the frame and a link connecting the rear end of the foot lever and one of the operating levers, substantially as and for the purpose set forth.

In testimony whereof, I have hereunto signed my name in the presence of two attesting witnesses, at Syracuse, in the county of Onondaga, in the State of New York, this 3rd day of August, 1912.

WILLIAM H. LEE.

Witnesses:
G. A. NEWMAN,
H. T. LEE.